(12) United States Patent
Faresin

(10) Patent No.: US 11,346,117 B2
(45) Date of Patent: May 31, 2022

(54) SUPPORTING AND GUIDING DEVICE FOR A CLIMBING FORMWORK BEAM AND SUCH BEAM

(71) Applicant: FARESIN FORMWORK S.P.A, Breganze (IT)

(72) Inventor: Guido Faresin, Bassano del Grappa (IT)

(73) Assignee: FARESIN FORMWORK S.P.A., Breganze (IT)

( * ) Notice: Subject to any disclaimer, the term of this patent is extended or adjusted under 35 U.S.C. 154(b) by 148 days.

(21) Appl. No.: 16/530,283

(22) Filed: Aug. 2, 2019

(65) Prior Publication Data

US 2020/0063452 A1 Feb. 27, 2020

(30) Foreign Application Priority Data

Aug. 22, 2018 (IT) .......................... 102018000008150

(51) Int. Cl.
*E04G 17/00* (2006.01)
*E04G 17/16* (2006.01)
*F16M 13/02* (2006.01)

(52) U.S. Cl.
CPC .............. *E04G 17/16* (2013.01); *F16M 13/02* (2013.01)

(58) Field of Classification Search
None
See application file for complete search history.

(56) References Cited

U.S. PATENT DOCUMENTS

| | | | | |
|---|---|---|---|---|
| 6,557,817 B2* | 5/2003 | Waldschmitt | ........... | E04G 11/28 182/36 |
| 8,033,361 B2* | 10/2011 | Maurer | .................... | E06C 7/187 182/112 |
| 9,303,418 B2* | 4/2016 | Schwoerer | .............. | E04G 11/28 |
| 10,590,664 B2* | 3/2020 | Aranburu Etxezarreta | | ................. E04G 5/046 |
| 2002/0050422 A1* | 5/2002 | Wymann | ................... | E04G 1/20 182/82 |
| 2002/0157900 A1* | 10/2002 | Ono | ......................... | E04G 3/00 182/82 |
| 2003/0127283 A1* | 7/2003 | Deal | ......................... | E06C 1/39 182/82 |
| 2009/0173574 A1* | 7/2009 | Hobmeier | ............... | E04G 11/28 182/82 |

(Continued)

FOREIGN PATENT DOCUMENTS

| | | |
|---|---|---|
| EP | 1972737 A2 | 9/2008 |
| KR | 101438191 B1 | 9/2014 |
| WO | WO 2009117986 A1 | 10/2009 |

OTHER PUBLICATIONS

Italian Search Report dated Dec. 12, 2018 issued in IT 201800008150, with partial translation.

*Primary Examiner* — Steven M Marsh
(74) *Attorney, Agent, or Firm* — Scully, Scott, Murphy & Presser, P.C.

(57) ABSTRACT

A supporting and guiding device for a climbing formwork beam and to such beam, comprising a supporting body to be coupled to a building structure, with which supporting means for the beam are associated, and at least one pair of guiding pins for the beam which can be activated by snap action transversely on opposite sides with respect to the beam and are adapted to be arranged in front of portions thereof.

6 Claims, 5 Drawing Sheets

(56) References Cited

U.S. PATENT DOCUMENTS

2012/0247869 A1* 10/2012 Anderson ................ E06C 9/02
                                                              182/8
2014/0339018 A1    11/2014 Blinn
2020/0149301 A1*  5/2020 Lee ..................... E04G 21/3247

\* cited by examiner

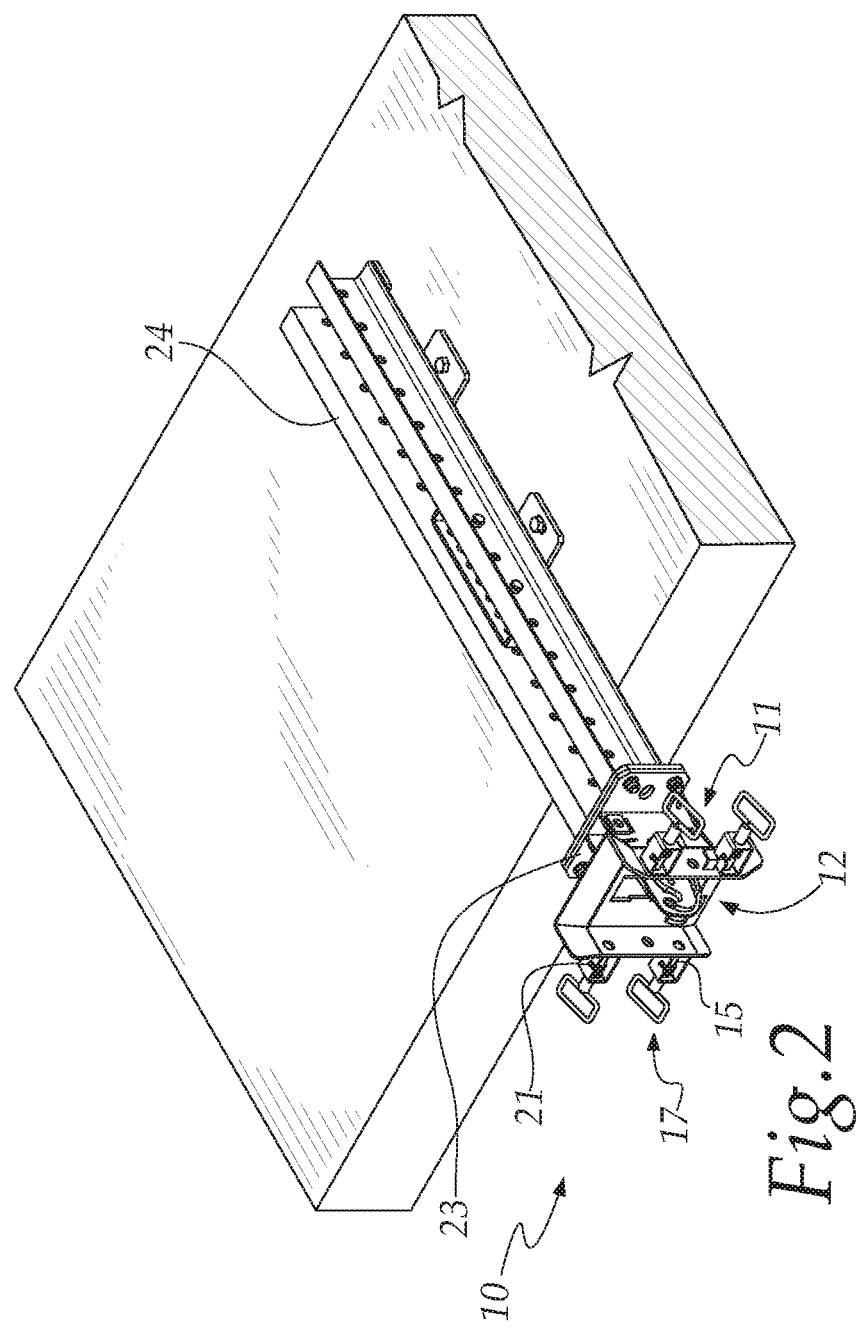

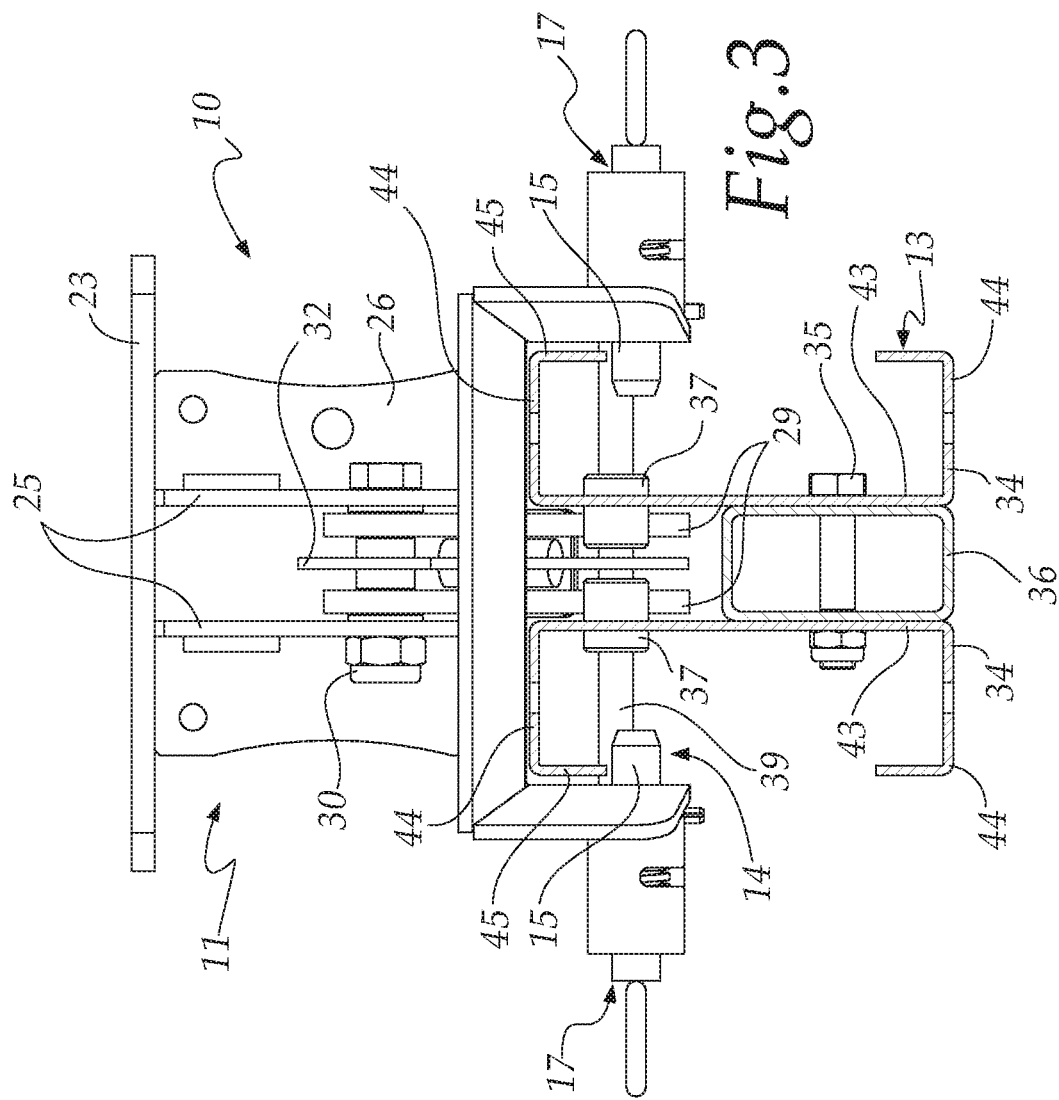

SUPPORTING AND GUIDING DEVICE FOR A CLIMBING FORMWORK BEAM AND SUCH BEAM

The present invention relates to a supporting and guiding device for a climbing formwork beam and a beam.

The invention is used in the construction industry in the construction equipment sector, in particular in formwork systems, for providing vertical protections for delimiting the outside edge of floors in buildings that have a significant elevation.

Such systems are made up mainly of the following three elements:
- a device for directly or indirectly anchoring to the concrete, which acts as a support for the entire system;
- a vertical beam which is adapted to translate vertically and which acts as a load-bearing element for pulling in translation secondary elements of the protection system (ledges, railings, protection panels etc.);
- a hydraulic piston connected with a lower end to the device and with the upper end to the beam.

The supporting device is provided with a mechanism for coupling with the beam.

In order to facilitate the coupling, the beam is conveniently composed of two C-shaped profiled members with the openings facing outward which are connected back to back by way of bolts and steel cylinders that act as spacers between the two profiled members, so as to obtain a monolithic beam. The length of the beam is variable according to the application.

The coupling device is provided with hooks that can rotate about a horizontal axis, in order to allow the passage of the beam during its vertical translation.

The beam can be moved by lifting with mechanical means, for example a site crane, or using a hydraulic piston with the lower end connected to the device and with its upper end placed on the beam, in an adapted region where there is a cylinder or a peg with which to be fastened by way of the adapted rotatable hooks.

In use, this system has two configurations. In an inactive configuration, each hook of the device supports the beam in a stationary position, arranged below a first cylinder or peg, while in an active configuration, during the lifting of the beam, the hook is pushed so as to rotate by a second cylinder or peg (in translation from below, on the beam) and, when lifting of the beam ends, returns to its initial position, thus supporting the beam at the second cylinder.

Another object of the device is to act as a guide during the step of lifting the beam that is coupled thereto. In fact, the system comprises multiple devices of the same type, installed along the floors, which extend vertically. To lift the beam to positions of increasing vertical height, at least two devices are needed along the beam itself: the lower one acts as a support and as a contrast surface for the hydraulic piston, if any, and the higher one acts as a guide during lifting and as a support only at the end of the lifting operation.

One type of device is described in DE2006001045. Such device comprises a support with which a pair of symmetrically-arranged hooks is associated, which are adapted to support the beam to be moved by translation, at a cylinder or horizontal pin thereof that spaces its two C-shaped profiled members apart, and comprises a pair of C-shaped jaws on opposite sides of the support which can rotate about a vertical axis and are adapted to be closed on the beam, each one on a respective wing of the beam. Substantially, in the configuration with the jaws closed the device acts as a guide during the vertical translation of the beam. The two jaws are adapted to each rotate about a vertical pin, and an extractable peg is adapted to block their rotation with respect to the support, in the closed position.

The peg is connected to the support by way of a chain in order to prevent it from becoming detached from the device and therefore getting lost.

Such device is not devoid of drawbacks.

It can be rather impractical to use the extractable peg, which during extraction has to get past several coupling points and therefore it can encounter obstructions or get jammed. Furthermore, connecting the peg to the support by a chain is not secure and can involve replacing it or looking for it, with consequent waste of time.

Another drawback lies in the use of jaws, the inertia of which can make their rotation difficult.

Therefore the device, owing to the various parts to be moved during its use, can be difficult to use and subject to malfunctions or to a tendency to jamming.

The aim of the present invention is to provide a supporting and guiding device for a climbing formwork beam which is capable of improving one or more of the above mentioned aspects of the known art.

Within this aim, an object of the invention is to provide a device that is easy to use and can be fastened to the beam rapidly and without jamming.

Furthermore, the present invention is aimed at overcoming the drawbacks of the known art in an alternative manner to any existing solutions.

Another object of the invention is to provide a device that is highly reliable, easy to implement and of low cost.

This aim and these and other objects which will become better apparent hereinafter are achieved by a supporting and guiding device for a climbing formwork beam, which comprises a supporting body to be coupled to a building structure, with which supporting means for said beam are associated, said device being characterized in that it comprises at least one pair of guiding pins for said beam which can be activated by snap action transversely on opposite sides with respect to said beam and are adapted to arrange themselves in front of portions thereof.

Further characteristics and advantages of the invention will become better apparent from the description of a preferred, but not exclusive, embodiment of the device according to the invention, which is illustrated by way of non-limiting example in the accompanying drawings wherein:

FIG. 2 is a perspective view of the device according to the invention associated with the end of a profiled element which is anchored to a building structure;

FIG. 3 is a plan view of the device according to the invention;

Figure 1:
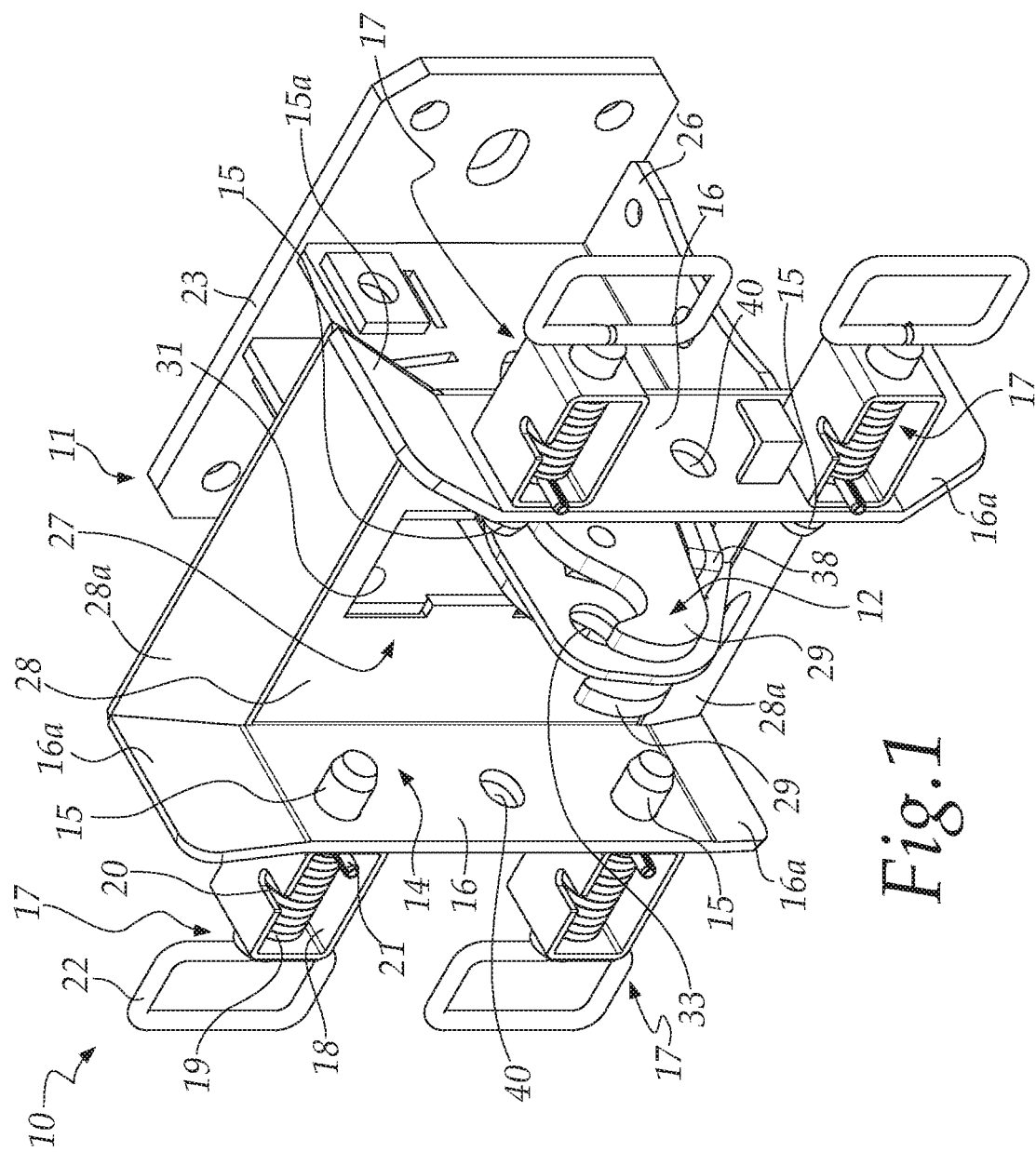
FIG. 1 is a perspective view of the device according to the invention.

With reference to the figures, the device according to the invention, generally designated by the reference numeral 10, comprises a supporting body 11 to be coupled to a building structure, with which supporting means 12 for a climbing formwork beam 13 are associated.

The device 10 is conveniently provided with a coupling seat 14 for the beam 13, in which the beam is adapted to slide. The seat 14 will be better described hereinafter.

The device 10 comprises at least one pair of guiding pins 15 for the beam 13 which can be activated by snap action transversely on opposite sides with respect to the beam 13 and are adapted to be arranged in front of portions thereof.

The device 10 is clearly visible in FIG. 1.

The supporting body 11 comprises two opposite plate-like lateral portions 16, which are adapted to laterally delimit the beam 13, each one supporting externally the guiding pins 15, at which it is perforated, with snap-acting activation means 17.

As illustrated, there are preferably two pairs of guiding pins 15 at different heights of the coupling seat 14.

The snap-acting activation means 17 comprise, for each pin 15:
- a receptacle 18 for the pin 15, substantially constituted by a box-like body which is open at one of its faces, inside which the pin 15 is adapted to slide in order to protrude from the respective lateral portion 16 toward the beam 13,
- a helical spring 19, which is wound around the pin 15 inside the receptacle 18,
- a slot 20 on a wall of the receptacle 18, which substantially is a recess of its opening, for the insertion of a dowel 21 which extends at right angles from the pin 15 at the end of the helical spring 19,
- a handle 22 on the outside of the receptacle 18, on an extension of the pin 15.

The handle 22 substantially makes it possible to pull outward and rotate the pin 15 until the dowel 21 thereof is inserted into the slot 20, defeating the elastic return force of the spring 19.

Preferably, there are two dowels 21 which protrude from diametrically opposite sides of the pin 15.

FIG. 1 and FIG. 3 clearly show the components of the supporting body 11.

It comprises:
- a vertical plate 23 to be integral with a building structure, such plate being perforated in order to allow the anchoring of the device 10, by way of bolting or anchoring members, directly to the concrete or to a steel beam 24 fixed to the concrete, as shown in FIG. 2,
- a pair of plates 25 which are arranged in a mirror-symmetrical and parallel fashion, extending from the vertical plate 23 and welded to this and above a horizontal plate 26,
- a C-shaped metal sheet 27, in front of the pair of plates 25, which is provided with a central portion 28 and the two previously-mentioned lateral portions 16, for at least partial containment of the beam 13.

The C-shaped metal sheet has flared portions 16a and 28a for receiving and guiding the beam 13.

Figure 5:
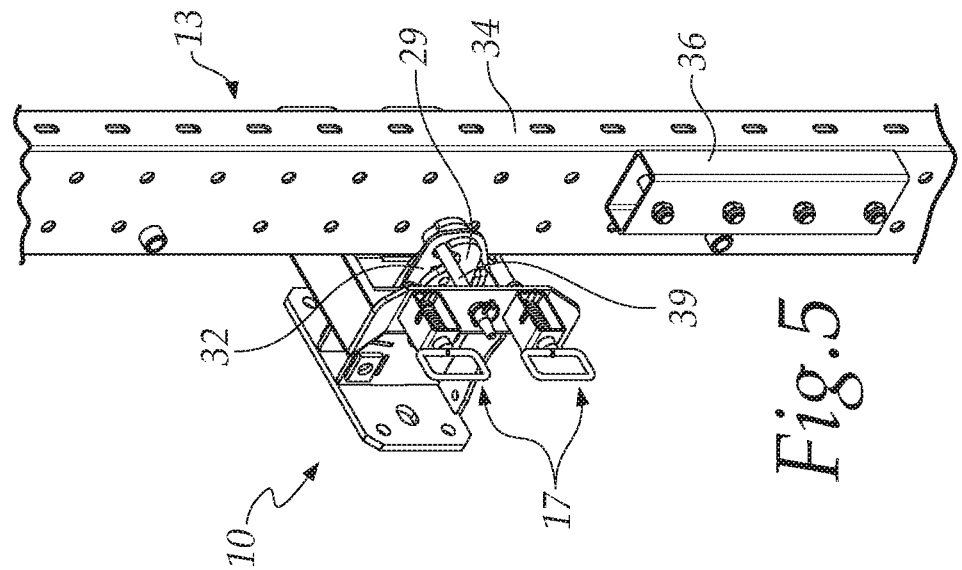
FIG. 5 shows the device in the previous figure, simplified in order to show some parts thereof.
Figure 4:
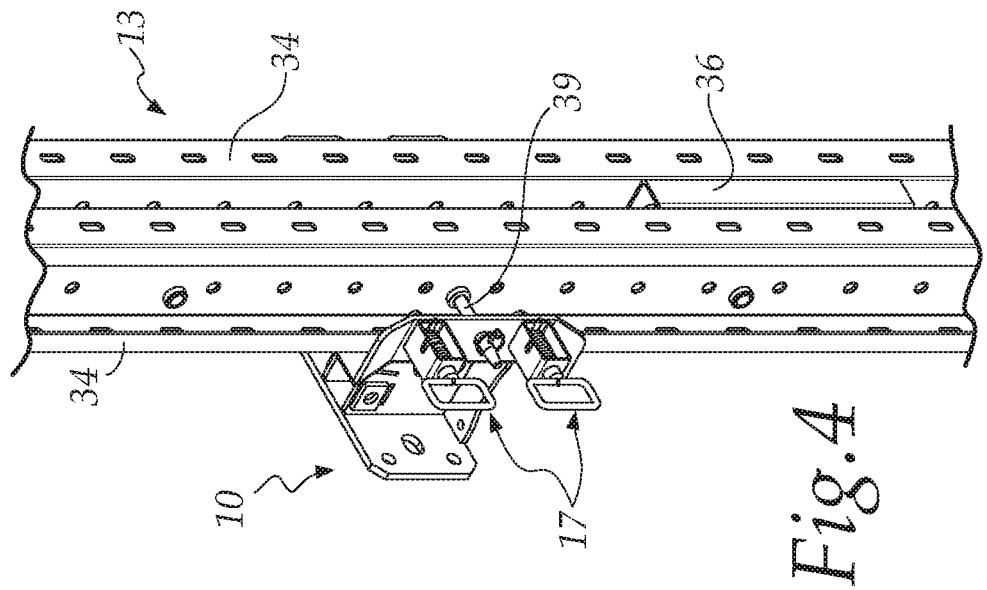
FIG. 4 shows the device according to the invention during the association of a climbing formwork beam.
Figure 6:
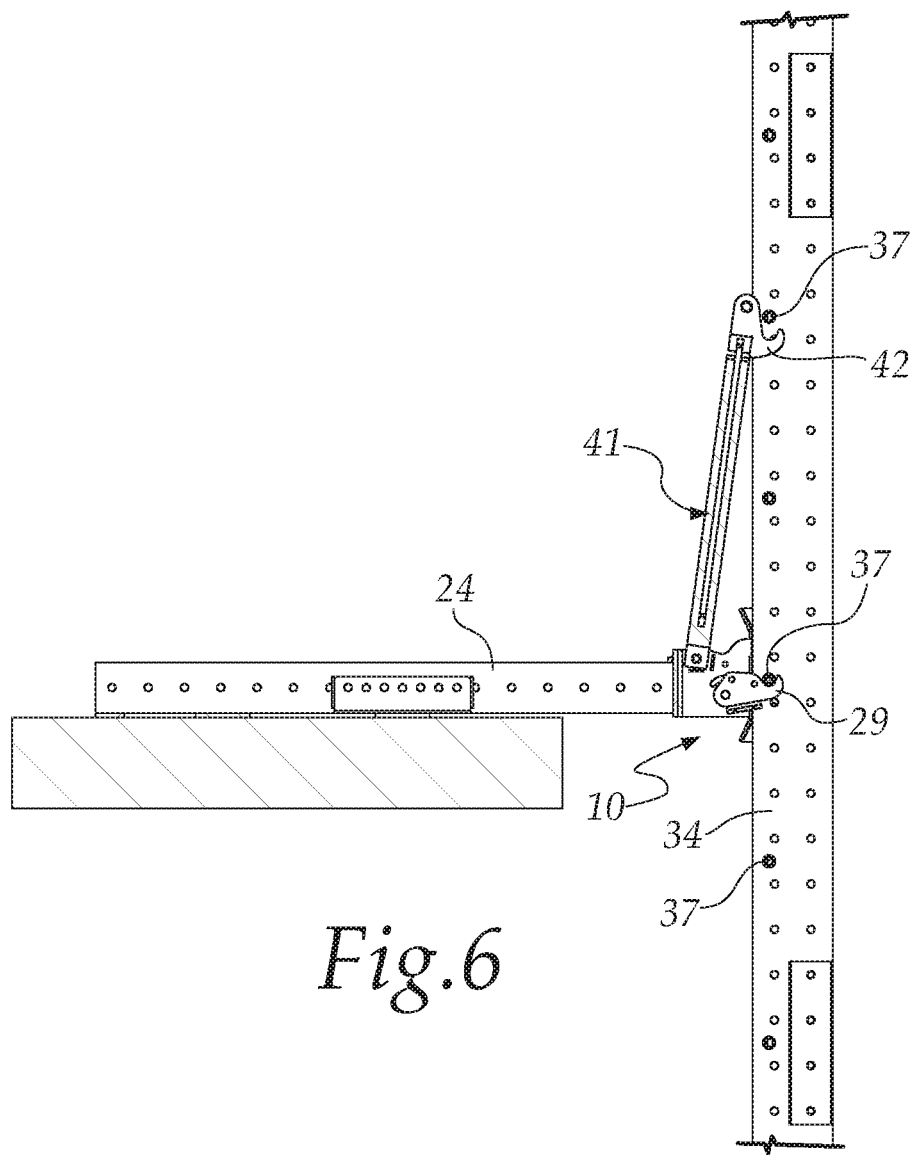
FIG. 6 is a cross-sectional side view of the device in a configuration for supporting the beam.

The supporting means 12 for the beam 13 comprise a pair of parallel and symmetrical hooks 29 which are adapted to support the beam 13 from at least one cylindrical portion thereof that is transverse to its longitudinal direction of extension, as shown in FIG. 3 and in FIGS. 4 to 6. The hooks 29 conveniently have a concavity directed upward, at which they are adapted to support the beam 13.

FIG. 3 shows a view from above of the device 10, with a beam 13 associated therewith.

The two hooks 29 are rotatable about a bolt 30 which passes transversely through the pair of plates 25, and protrudes between the lateral portions 16 from a window 31 in the central portion 28 of the C-shaped metal sheet 27.

Between the two hooks 29 there is a fixed plate-like element 32, non-rotatable, which has a hole 33 corresponding to the cavities of the hooks 29, and also two plate-like protrusions 38 on opposite sides which act as a lower stop element for the hooks 29.

The coupling seat 14 is defined by the C-shaped metal sheet 27. The beam 13 is therein positioned supported by the hooks 29.

FIG. 3, and also FIGS. 4 and 5, also show the structure of the beam 13.

It comprises:
- a pair of longitudinally extended profiled elements 34 that are substantially C-shaped in cross-section, each element is defined by a core 43 and two wings 44 blended therewith, which are connected by bolts 35 and spaced apart by at least one tubular spacer 36 with a rectangular cross-section which is installed in a first half of the core of the beam 13 (looking at it in cross-section),
- pairs of hollow cylindrical elements 37, in a second half of the core of the beam 13, toward the device 10, which are arranged so as to be aligned and spaced apart, each one passing transversely, in a corresponding hole, through the core of a respective profiled element 34, and are adapted to rest on the hooks 29.

Each profiled element 34 of the beam 13 has in cross-section, at the ends of the wings 44, protrusions 45 that are parallel to the core 43 and which extend for the length of the profiled element 34.

Such protrusions 45 represent the portions in front of which the pins 15 are arranged.

The hollow cylindrical elements 37 are adapted to rest on the top of the respective hooks 29 when the beam is supported, as shown in FIGS. 3 and 5.

Each one of these passes through the core of a respective profiled element 34 and when the beam 13 is positioned in the coupling seat, they are arranged on the opposite sides of the fixed plate-shaped element 32, in axial alignment with the hole 33 in order to allow the optional insertion of a safety peg 39.

The two lateral portions 16 conveniently have a respective hole 40 for the passage of the peg 39. This can be inserted transversely, with respect to the longitudinal direction of extension of the beam 13, passing through the beam 13, at the pair of cylindrical elements 37 resting on the hooks 29, the fixed element 32, at the hole 33, and the two lateral portions 16, at the holes 40.

In a system for lifting the formwork there is also a hydraulic piston 41, of the type shown in cross-section in FIG. 6. It is of a per se known type.

The piston 41 is fixed with a lower end to the device 10. At the opposite, upper end, located on the translating internal part, it has a double hook 42 with which, as a consequence of its activation, it is adapted to engage a cylindrical element 37, higher than the one resting on the hooks 29 of the device 10, in order to pull up the beam 13 in translation from below.

The use of the device according to the invention is as follows.

In an initial position the beam 13 is positioned vertically. By rotating the handles 22 the operator causes the snap-activation of the pins 15, which protrude into the coupling seat 14 in front of a portion of the beam 13. It is guided by the pins and rests with the cylindrical elements 37 on the hooks 29.

The peg 39 is inserted so as to pass through the device and the beam.

Before imposing a translation, the peg 39 is extracted.

The piston 41, by means of a hydraulic control unit, is activated and opens with the extraction of its internal part, which pushes the double hook 42 to engage a cylindrical element 37, higher than the one on which the beam rests in the device 10, pulling up the beam 13 in translation, and therefore the formwork.

During the translation the beam 13 is guided by the pins 15.

A pair of cylindrical elements 37 which initially are below the device, by translating vertically, interact with the hooks 29, by being rotated during the transition of the elements 37.

Upon reaching the desired position, the piston 41 returns to its inactive position, leaving the beam 13 resting with the cylindrical elements 37 on the hooks 29.

In practice it has been found that the invention fully achieves the intended aim and objects by providing a device that is easy to use and which is capable of being fastened to the beam rapidly, without jamming and without complex mechanisms.

Furthermore, the device and the beam constitute a system that is efficient and simple to use.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102018000008150 from which this application claims priority are incorporated herein by reference.

What is claimed is:

1. A supporting and guiding device for a climbing formwork beam, which comprises a supporting body to be coupled to a building structure, with which supporting means for said beam are associated, said device comprising at least one pair of guiding pins for said beam which can be activated by snap action transversely on opposite sides with respect to said beam and are adapted to be arranged in front of portions thereof, wherein said supporting body comprises two opposite lateral plate portions, which are adapted to laterally delimit said beam, each one supporting externally at least one guiding pin, at which it is perforated, with snap-acting activation means, wherein said snap-acting activation means comprise, for each pin:
    a receptacle for said pin, inside which it is adapted to slide in order to protrude from a respective lateral plate portion toward said beam,
    a helical spring, which is wound around said pin inside said receptacle,
    a handle on the outside of said receptacle, on an extension of said pin,
    a slot on a wall of said receptacle for the insertion of a dowel which extends at right angles from said pin at the end of said helical spring that is directed toward the respective said wall.

2. The device according to claim 1, wherein said supporting body comprises:
    a vertical plate to be integral with said building structure,
    a pair of plates which are arranged in a mirror-symmetrical and parallel fashion, extending from said vertical plate,
    a C-shaped metal sheet, in front of said pair of plates, which is provided with a central portion and two opposite lateral portions for at least partial containment of said beam.

3. The device according to claim 1, further comprising a C-shaped metal sheet, in front of a pair of plates of the supporting body, wherein said supporting means for said beam comprise a pair of parallel and symmetrical hooks which are adapted to support said beam by at least one cylindrical portion thereof which is transverse to its longitudinal direction of extension, said pair of hooks being rotatable about a bolt which passes transversely through a pair of plates and protruding between lateral plate portions from a window in a central portion of said C-shaped metal sheet.

4. The device according to claim 3, further comprising a fixed plate which is interposed between said pair of hooks and is provided with a hole corresponding to cavities of said pair of hooks.

5. The device according to claim 2, provided with a coupling seat for coupling to said beam which is defined by said C-shaped metal sheet, said beam comprising:
    a pair of longitudinally extended profiled elements that are substantially C-shaped in cross-section, which are connected by means of bolts with openings toward the outside and spaced apart by at least one tubular spacer with a rectangular cross-section which is installed in a first half of a core of said beam,
    pairs of hollow cylindrical elements, in a second half of the core of said beam, toward said device, which are arranged so as to be aligned and spaced apart, each one passing transversely, in a corresponding hole, through a core of a respective profiled element, and are adapted to rest on said pair of hooks.

6. A supporting and guiding device for a climbing formwork beam, which comprises:
    a supporting body to be coupled to a building structure, with which supporting means for said beam are associated, said device comprising at least one pair of guiding pins for said beam which can be activated by snap action transversely on opposite sides with respect to said beam and are adapted to be arranged in front of portions thereof; and
    a C-shaped metal sheet, in front of a pair of plates of the supporting body, wherein said supporting means for said beam comprise a pair of parallel and symmetrical hooks which are adapted to support said beam by at least one cylindrical portion thereof which is transverse to its longitudinal direction of extension, said pair of hooks being rotatable about a bolt which passes transversely through a pair of plates and protruding between lateral plate portions from a window in a central portion of said C-shaped metal sheet.

* * * * *